United States Patent
Sugawara et al.

(10) Patent No.: US 7,295,736 B2
(45) Date of Patent: Nov. 13, 2007

(54) IMAGE PICKUP DEVICE

(75) Inventors: Takeo Sugawara, Hamamatsu (JP);
Yoshio Natsume, Hamamatsu (JP)

(73) Assignee: Hamamatsu Photonics K.K., Shizuoka (JP)

( * ) Notice: Subject to any disclaimer, the term of this patent is extended or adjusted under 35 U.S.C. 154(b) by 808 days.

(21) Appl. No.: 10/487,145

(22) PCT Filed: Aug. 23, 2002

(86) PCT No.: PCT/JP02/08525
§ 371 (c)(1),
(2), (4) Date: Feb. 23, 2004

(87) PCT Pub. No.: WO03/019666
PCT Pub. Date: Mar. 6, 2003

(65) Prior Publication Data
US 2004/0218085 A1 Nov. 4, 2004

(30) Foreign Application Priority Data
Aug. 24, 2001 (JP) ............................. 2001-255121

(51) Int. Cl.
*G02B 6/08* (2006.01)
(52) U.S. Cl. ..................................... 385/120
(58) Field of Classification Search ............... None
See application file for complete search history.

(56) References Cited

U.S. PATENT DOCUMENTS

| | | | |
|---|---|---|---|
| 5,166,948 A * | 11/1992 | Gavrilovic et al. ............ | 372/70 |
| 5,329,386 A * | 7/1994 | Birecki et al. ................. | 349/63 |
| 5,903,694 A | 5/1999 | Sugawara ...................... | 385/121 |
| 6,495,850 B1 * | 12/2002 | Struye et al. ................ | 250/586 |
| 2002/0158205 A1 * | 10/2002 | Sato et al. .................. | 250/361 R |
| 2003/0116714 A1 * | 6/2003 | Homme et al. .............. | 250/370.11 |

(Continued)

FOREIGN PATENT DOCUMENTS

EP 0 803 745 A1 10/1997

(Continued)

OTHER PUBLICATIONS

Binns, W.R., et al., "A Scintillating Optical Fiber Track Imaging Detector," Nuclear Instruments & Methods in Physics Research, Section A: Accelerators, Spectrometers, Detectors and Associated Equipment, North-Holland Publishing Company, Amsterdam, NL, vol. A251, No. 2, Oct. 15, 1986, ps. 402-406.

*Primary Examiner*—Rodney Bovernick
*Assistant Examiner*—Mike Stahl
(74) *Attorney, Agent, or Firm*—Drinker Biddle & Reath LLP

(57) ABSTRACT

An image pickup device according to the present invention comprises (1) a fiber optical plate constituted by bundling a plurality of optical fibers, including a core and a cladding covering an outer periphery thereof and having a light incident surface and a light-emitting surface inclined with respect to the optical axis direction of a plurality of optical fibers; (2) a plurality of columnar crystals having light permeability, formed on the light-emitting surface of the fiber optical plate; and (3) a solid-state image pickup device having photoelectric converters arrayed and formed in two-dimensional fashion on a main surface of a semiconductor substrate and optically coupled to a plurality of columnar crystals.

4 Claims, 2 Drawing Sheets

U.S. PATENT DOCUMENTS

2004/0041100 A1* 3/2004 Maezawa et al. ........ 250/484.4

FOREIGN PATENT DOCUMENTS

| | | |
|---|---|---|
| JP | 64-024204 | 1/1989 |
| JP | 06-203776 | 7/1994 |
| JP | 07-174947 | 7/1995 |
| JP | 09-288223 | 11/1997 |
| WO | WO 98/65375 | 11/2000 |

* cited by examiner

IMAGE PICKUP DEVICE

TECHNICAL FIELD

The present invention relates to an image pickup device, and more specifically to the image pickup device adapted for detecting concave and convex patterns existing on the surface of an object to be measured such as a fingerprint.

BACKGROUND ART

As an image pickup device, Japanese Unexamined Patent Publication No. 07-174947 discloses a fingerprint-detecting device formed by joining a fiber optical plate constituted by integrally bundling a plurality of optical fibers to a solid-state image pickup device such as a CCD (charge coupled device) image sensor.

DISCLOSURE OF THE INVENTION

As a result of examining the above-mentioned prior art of technique the inventor has discovered following problems to be solved. In an image pickup device disclosed in Japanese Unexamined Patent Publication No. 07-174947, the light-emitting surface of a fiber optical plate is inclined with respect to the optical axis of a plurality of optical fibers. The light-emitting surface and a solid-state image pickup device are optically directly coupled to each other. Therefore, even if an image of a fingerprint is made incident on the plate through the finger touching the light incident surface, light in a large amount is reflected on the light-emitting surface, resulting in a significant decrease in the amount of light received by the solid-state image pickup device. As a consequence, there is posed the problem that an image pickup characteristic is deteriorated due to the darker image of the fingerprint to be detected.

An object of the present invention is to solve the above-described problem, and provide the image pickup device capable of improving the image pickup characteristic, by increasing the amount of light emitted from the fiber optical plate and received by the solid-state image pickup device.

The image pickup device according to the present invention comprises (1) the fiber optical plate constituted by bundling a plurality of optical fibers including a core and a cladding to cover an outer periphery of the core, and having a light incident surface and a light-emitting surface inclined with respect to the optical axis of a plurality of optical fibers; (2) a plurality of columnar crystals having light permeability, formed on the light-emitting surface of the fiber optical plate; and (3) the solid-state image pickup device having photoelectric converters arrayed and formed in two-dimensional fashion on a main surface of a semiconductor substrate, and optically coupled to a plurality of columnar crystals.

In the above image pickup device, plural columnar crystals are formed on the light-emitting surface of the fiber optical plate. Therefore, the light propagated in the inside of each optical fiber is restrained from being reflected on the light-emitting surface, and a large amount of light is made incident on the columnar crystals. Then, each of a plurality of columnar crystals functions like optical fibers, and incident light is guided to the inside of the columnar crystals and scattered at an end part of the light-emitting side. A large amount of light is thus emitted from the columnar crystals and received by the solid-state image pickup device. In this way, the above-described image pickup device is capable of improving the image pickup characteristic by increasing the amount of light received by the solid-state image pickup device.

Also, in the image pickup device according to the present invention, a plurality of columnar crystals are preferably constituted of at least one of CsI, NaI, LiI, KI, KBr, KCl, and NaCl. These substances are capable of constituting the columnar crystals and exhibit light permeability for light that has passed through the fiber optical plate, and therefore preferable.

In the image pickup device according to the present invention, a sectional area at the end part of the light incident side of each of the columnar crystals may be made smaller than the sectional area at the end part of the light-emitting side of each of the optical fibers. Thus, deterioration in resolution can be suppressed.

In the image pickup device according to the present invention, a plurality of columnar crystals may be formed by crystal growth by the use of oblique vapor deposition on the light-emitting surface of the fiber optical plate. Thus, there can be formed with ease a plurality of columnar crystals, inclined with respect to the light-emitting surface on the light-emitting surface of the fiber optical plate.

The present invention will become more fully understood from the detailed description given hereinbelow and the accompanying drawings. They are given by way of illustration only, and thus should not be considered limitative of the present invention.

BEST MODES FOR CARRYING OUT THE INVENTION

Figure 1:
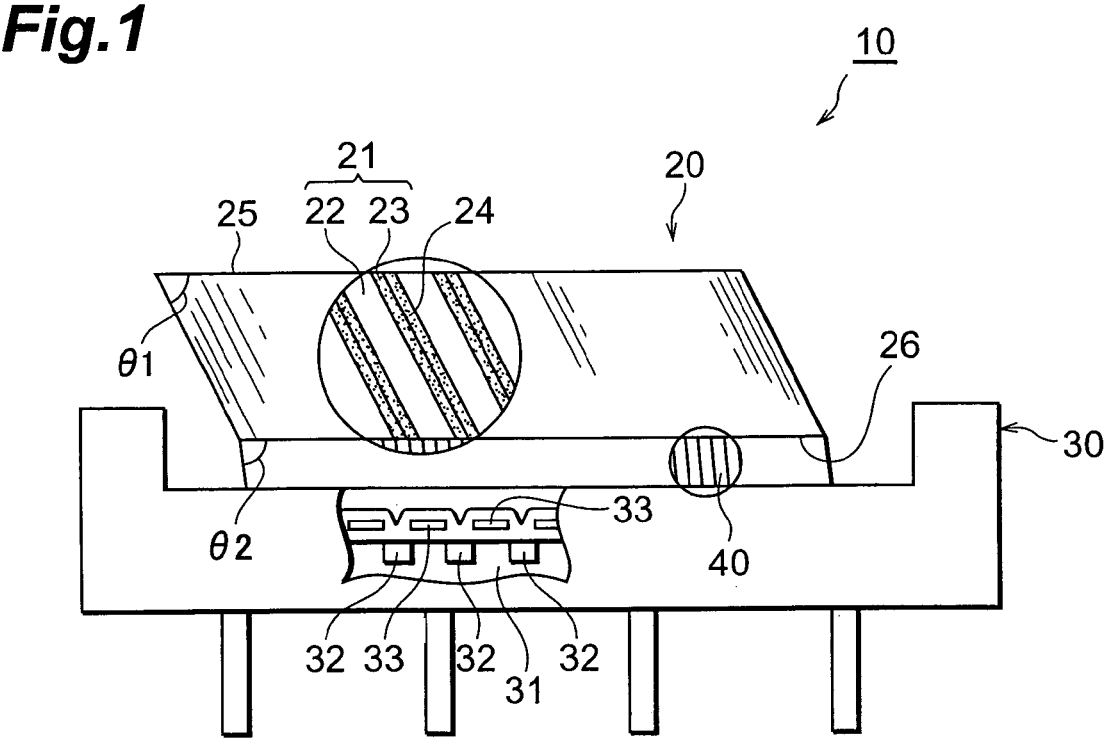
FIG. 1 is a view showing the constitution of a fingerprint detecting device as an image pickup device according to the present embodiment.

Hereafter, the preferred embodiments of an image pickup device according to the present invention will be explained with reference to the accompanying drawings. The components and portions of the same designation as those in the drawings used for the explanation so far are designated the same numerals and signs, omitting the overlapping explanation.

FIG. 1 is a view showing the constitution of a fingerprint detecting device as an image pickup device according to the present embodiment. As shown in FIG. 1, a fingerprint detecting device 10 includes a fiber optical plate 20, a solid-state image pickup device 30, and a plurality of columnar crystals 40 having light permeability.

The fiber optical plate 20 is constituted by bundling a plurality of optical fibers 21. The fiber optical plate 20 has a light incident surface 25 and a light-emitting surface 26 inclined with respect to the optical axis of a plurality of optical fibers at a predetermined inclined angle θ1 so as not to be parallel or vertical to the axis of the optical fibers 21. The light incident surface 25 and the light-emitting surface 26 oppose each other to be parallel to each other. The optical fibers 21 constituting the fiber optical plate 20 have a core 22 and a cladding 23 to cover an outer periphery of the core 22. The refractive index of the core 22 is set to be larger than that of the cladding 23, so that light can be propagated along the core 22. Further, a light absorber 24 is provided between each of the optical fibers 21, so that light is absorbed by the light absorber 24 and disappears when the light incident on the optical fibers 21 propagates outside the cladding 23, thereby preventing the light from being transmitted to the adjacent optical fibers 21.

Figure 2:
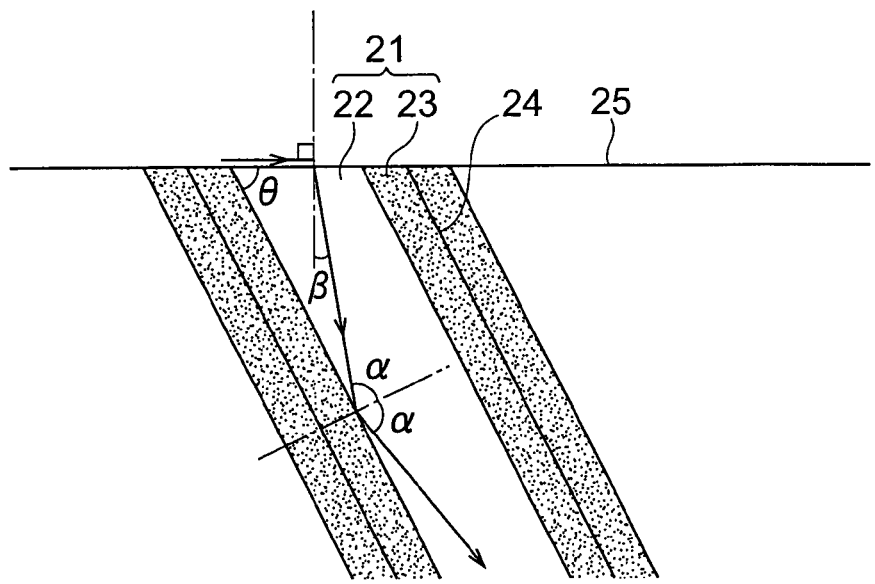
FIG. 2 is an explanatory view for illustrating an angle of inclination of a fiber optical plate.

The inclined angle θ1 here is preferably set to such a value that light incident on the core 22 of the optical fiber 21 from the air causes no total reflection on the boundary surface interfacing with the cladding 23. For example, the inclination angle θ to be set is obtained by substituting α and β satisfying the following equations (1) and (2) into equation (3):

$$n_1 \sin \beta = n_0 \sin 90° \text{ (for the inclination angle of 90°)} \quad (1)$$

$$n_1 \sin \alpha = n_2 \sin 90° \text{ (for total reflection)} \quad (2)$$

$$\theta + (90° + \beta) + (90° - \alpha) = 180° \quad (3)$$

where β is the angle of refraction in the optical fibers 21 when the light is made incident on the optical fibers 21 from a direction substantially parallel to the light incident surface 25, α is the critical incident angle when this light is made incident on the boundary surface between the core 22 and the cladding 23 as it propagates while repeating total reflection on the boundary surface, $n_0$ is the refractive index of air, $n_1$ is the refractive index of the core 22, and $n_2$ is the refractive index of the cladding 23, as shown in FIG. 2.

When $n_0=1$, $n_1=1.56$, and $n_2=1.52$, the inclination angle θ=37° is calculated from these equations (1), (2) and (3). Therefore, when the inclination angle θ1 is set to a value smaller than angle 37°, even if the light is made incident on the optical fibers 21 of the fiber optical plate 20 from the air, this light does not propagate in the optical fibers 21. In other words, if the inclined angle θ1 is set as above, light incident from the air to the fiber optical plate 20 will not emerge from the fiber optical plate 20, but, only light incident on the fiber optical plate 20 through an object which is in contact with the light incident surface 25 emerges, thus improving the image pickup characteristic.

The solid-state image pickup device 30 has photoelectric converters arrayed and formed in two-dimensional fashion on the main surface of a semiconductor substrate. Typical example of such a solid-state image pickup device 30 includes a CCD image sensor and a CMOS image sensor or the like. In this embodiment, explanation will be made over the interline transfer system CCD-type image sensor (ITCCD) as the solid-state image pickup device 30.

In the ITCCD as the solid-state image pickup device 30, photoelectric converters 32 are formed in a P-type well 31 arrayed and formed in a two-dimensional fashion on the main surface of the semiconductor substrate. Between each of the photoelectric converters 32, a vertical CCD and a horizontal CCD (not shown) are formed, so as to transfer signal charges accumulated in the photoelectric converters 32 in the vertical direction and in the horizontal direction, respectively, and light shielding layers 33 are provided in areas corresponding to upper parts of the vertical CCD and the horizontal CCD. Thus the light transmitted between each of the shielding layers 33 and received by the photoelectric converters 32 is photo electrically converted into signal charges and accumulated as the signal charges. The signal charges are transferred by the vertical CCD and the horizontal CCD, and then outputted from an output part not shown to an image processing system.

Plural columnar crystals 40 are provided on the light-emitting surface 26 of the fiber optical plate 20. A plurality of columnar crystals 40 have light permeability in a band to be used (for example, wavelength band of visible light), and the optical axis of a plurality of optical fibers (crystal growth direction) is provided obliquely to the light-emitting surface 26 of the fiber optical plate 20. More specifically, each of the columnar crystals 40 is provided such that it is inclined at a prescribed inclined angle θ2 (θ2≦90°) with respect to the light-emitting surface 26, in the same direction as the direction in which each optical fiber 21 is inclined to the light incident surface 25 of the fiber optical plate 20. In the fingerprint detecting device 10 according to the present embodiment, it is preferable to set the inclined angle θ2 to an angle so that the light propagated through the columnar crystals 40 and emitted from the end part of the light-emitting side is made incident vertically on the solid-state image pickup device 30. Thus, a large amount of light can be emitted from the columnar crystals 40 and received by the solid-state image pickup device 30, thereby improving the image pickup characteristic.

A plurality of columnar crystals 40 are preferably constituted of at least one of CsI, NaI, LiI, KI, KBr, KCl, and NaCl. These substances are capable of constituting the columnar crystals and have light permeability to light that has passed through the fiber optical plate 20, and therefore turns out preferable.

Here, it is preferable that the thickness of each of the columnar crystals 40 is made smaller than the thickness of each of the optical fibers 21, and the sectional area at the end part of the light incident side of each columnar crystal 40 is made smaller than the sectional area at the end part of the light-emitting side of each optical fiber 21. Thus, deterioration in resolution of objects to be measured is suppressed.

Moreover, it is preferable that each of the columnar crystals 40 has a refractive index larger than the refractive index of the core 22 of the optical fiber 21. Thus, the light reflection on the light-emitting surface 26 of the fiber optical plate 20 is suppressed, and therefore larger amount of light can be guided to the columnar crystals 40. Note that the refractive index of the substance such as the above-described CsI is about 1.5 to 2.0. Therefore, it is preferable to suitably select and use the optical fiber 21, such that the refractive index of the core 22 of the optical fiber 21 is made smaller than the above refractive index values.

Figure 3:
FIG. 3 is a view showing a result obtained by observation of a plurality of columnar crystals by microscope.

The plurality of columnar crystals 40 described above can be easily manufactured by oblique vapor deposition on the light-emitting surface 26 of the fiber optical plate 20. At this time, the length of each of the columnar crystals 40 is preferably set to be about 50 μm to 500 μm. FIG. 3 is a view showing a result obtained by observation by microscope of the a plurality of columnar crystals 40 constituted by obliquely vapor-depositing the CsI on the light-emitting surface 26 of the fiber optical plate 20. As shown in the figure, a plurality of columnar crystals 40 of CsI are formed at high density on the light-emitting surface 26 of the fiber optical plate 20. In this embodiment, the length of each of the columnar crystals 40 was about 100 μm, and the thickness thereof (sectional area) was about 50 μm².

Note that the fiber optical plate 20 on which a plurality of columnar crystals 40 are obliquely vapor-deposited can be fixed to the solid-state image pickup device 30 by joining by use of an adhesive.

Thus, with a plurality of columnar crystals 40 and the solid-state image pickup device 30 optically coupled to each other, the fiber optical plate 20, a plurality of columnar crystals 40, and the solid-state image pickup device 30 are assembled, thereby constituting the fingerprint detecting device 10.

Next, the function and effectiveness of the fingerprint-detecting device 10 according to the present embodiment will be explained.

In the fingerprint detecting device 10 according to the present invention, a plurality of columnar crystals 40 are formed on the light-emitting surface 26 of the fiber optical plate 20. Therefore, the light propagated in the inside of each optical fiber 21 is inhibited from being reflected on the light-emitting surface 26. Accordingly, a large amount of light is made incident on a plurality of columnar crystals 40. Each of a plurality of columnar crystals 40 functions like the optical fibers, so that incident light is guided to the inside of the columnar crystals 40, scattered by the function of a screen, so to speak, at the end part of the light-emitting side, and then, a large amount of light is emitted from the columnar crystals 40 and are received by the solid-state image pickup device 30. Thus, in the fingerprint detecting device 10, the amount of light received by the solid-state image pickup device 30 is increased, thereby improving the image pickup characteristic.

Also, in the fingerprint detecting device 10 according to the present embodiment, substances such as CsI are obliquely vapor-deposited on the light-emitting surface 26 of the fiber optical plate 20 as a plurality of columnar crystals 40, thus contributing to miniaturization of the device.

Japanese Unexamined Patent Publication No. 09-288223 discloses the fingerprint detecting device constituted by joining the first fiber optical plate to the second fiber optical plate having a larger inclined angle than that of the first fiber optical plate, and the joined optical plates are further coupled to the solid-state image pickup device such as a CCD image sensor. In such a fingerprint detecting device also, the emitting angle of the light emitted from the emitting surface of the second fiber optical plate becomes wide. Therefore, the amount of light emitted becomes large, and a fingerprint image to be detected can be viewed brightly, thus improving the image pickup characteristic. However, the problem is that high alignment accuracy is required in the above fingerprint-detecting device when joining the two fiber optical plates. In this case, the fingerprint-detecting device cannot be easily manufactured, and two expensive fiber optical plates are required also, thus raising the cost. On the contrary, the fingerprint-detecting device 10 according to the present embodiment can be easily manufactured without requiring high alignment accuracy when joining the two fiber optical plates. Moreover, only one fiber optical plate 20 is sufficient, which is advantageous in terms of cost, and device miniaturization is to be attained by forming the columnar crystals 40 thin.

From the foregoing explanations of the invention, it will be obvious that the same may be varied in many ways. Such variations are not to be regarded as a departure from the spirit and scope of the invention, and all such modifications as would be obvious to one skilled in the art are intended to be included within the scope of the following claims.

INDUSTRIAL APPLICABILITY

The present invention provides an image pickup device capable of improving an image pickup characteristic by increasing an amount of light emitted from a fiber optical plate and received by a solid-state image pickup device.

The invention claimed is:

1. An image pickup device, comprising:
   a fiber optical plate constituted by bundling a plurality of optical fibers including a core and a cladding covering an outer periphery of the core, and having a light incident surface and a light-emitting surface inclined with respect to the optical axis of the plurality of optical fibers;
   a plurality of columnar crystals having light permeability formed on the light-emitting surface of the fiber optical plate; and
   a solid-state image pickup device having photoelectric converters arrayed and formed in two-dimensional fashion on a main surface of a semiconductor substrate and optically coupled to said plurality of columnar crystals.

2. An image pickup device according to claim 1, wherein said plurality of columnar crystals are constituted of at least one of CsI, NaI, LiI, KI, KBr, KCl and NaCl.

3. An image pickup device according to claim 1, wherein a sectional area at an end part of the light incident side of each of said columnar crystals is made smaller than the sectional area at an end part of the light-emitting side of each of said optical fibers.

4. An image pickup device according to claim 1, wherein said plurality of columnar crystals are formed by crystal growth by the use of oblique vapor deposition on said light-emitting surface of the fiber optical plate.

* * * * *